United States Patent
Jo et al.

(10) Patent No.: US 12,116,483 B2
(45) Date of Patent: Oct. 15, 2024

(54) CONJUGATED DIENE-BASED COPOLYMER COMPOSITION, METHOD OF PREPARING THE SAME, AND RUBBER COMPOSITION INCLUDING THE SAME

(71) Applicant: LG Chem, Ltd., Seoul (KR)

(72) Inventors: In Sung Jo, Daejeon (KR); Byoung Yun Kim, Daejeon (KR); Hyung Woon Yoon, Daejeon (KR); Se Eun Lee, Daejeon (KR); Woo Seok Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 677 days.

(21) Appl. No.: 17/299,133

(22) PCT Filed: Sep. 2, 2020

(86) PCT No.: PCT/KR2020/011743
§ 371 (c)(1),
(2) Date: Jun. 2, 2021

(87) PCT Pub. No.: WO2021/071096
PCT Pub. Date: Apr. 15, 2021

(65) Prior Publication Data
US 2022/0073708 A1    Mar. 10, 2022

(30) Foreign Application Priority Data

Oct. 11, 2019 (KR) .......................... 10-2019-0126418
Aug. 21, 2020 (KR) .......................... 10-2020-0105337

(51) Int. Cl.
| | |
|---|---|
| C08L 9/06 | (2006.01) |
| B60C 1/00 | (2006.01) |
| C08F 2/22 | (2006.01) |
| C08F 220/20 | (2006.01) |
| C08K 3/36 | (2006.01) |

(52) U.S. Cl.
CPC ...... *C08L 9/06* (2013.01); *C08F 2/22* (2013.01); *C08F 220/20* (2013.01); *C08K 3/36* (2013.01); *B60C 1/00* (2013.01); *C08L 2205/025* (2013.01)

(58) Field of Classification Search
CPC ........ C08L 9/06; C08L 2205/025; C08F 2/22; C08F 220/20; C08K 3/36; B60C 1/00
See application file for complete search history.

(56) References Cited

U.S. PATENT DOCUMENTS

| | | | |
|---|---|---|---|
| 6,111,045 A | 8/2000 | Takagishi et al. | |
| 7,671,128 B1 * | 3/2010 | Thielen | ..................... C08L 9/00 525/218 |
| 2002/0173560 A1 | 11/2002 | Thielen | |
| 2012/0289647 A1 | 11/2012 | Koelle et al. | |
| 2019/0375922 A1 | 12/2019 | Lee et al. | |
| 2020/0223960 A1 | 7/2020 | Jo et al. | |

FOREIGN PATENT DOCUMENTS

| | | |
|---|---|---|
| EP | 1241204 A1 | 9/2002 |
| EP | 1308318 A2 | 5/2003 |
| EP | 3045493 B1 | 9/2017 |
| EP | 3530680 A1 | 8/2019 |
| JP | H09183820 A | 7/1997 |
| JP | 2002293994 A | 10/2002 |
| JP | 2019535888 A | 12/2019 |
| KR | 20010004466 A | 1/2001 |
| KR | 20020077625 A | 10/2002 |
| KR | 20130027465 A | 3/2013 |
| KR | 20190023676 A | 3/2019 |
| KR | 20190073693 A | 6/2019 |
| KR | 20190074510 A | 6/2019 |
| WO | 2019045319 A1 | 3/2019 |
| WO | 2019124744 A1 | 6/2019 |

OTHER PUBLICATIONS

Extended European Search Report for EP Application No. EP20874272.6 dated Feb. 16, 2022, 3 pgs.
International Search Report for Application No. PCT/KR2020/011743, mailing dated Dec. 10, 2020, 3 pages.

* cited by examiner

*Primary Examiner* — Ling Siu Choi
*Assistant Examiner* — Andrea Wu
(74) *Attorney, Agent, or Firm* — Lerner David LLP

(57) ABSTRACT

A conjugated diene-based copolymer composition, a method of preparing the same, and a rubber composition including the same are provided. The conjugated diene-based copolymer composition includes a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer. The first conjugated diene-based copolymer includes 0.01 wt % to 1 wt % of the repeating unit derived from the hydroxyalkyl (meth)acrylate monomer, and the second conjugated diene-based copolymer includes 4.5 wt % to 6.5 wt % of the repeating unit derived from the hydroxyalkyl (meth)acrylate monomer.

13 Claims, No Drawings

CONJUGATED DIENE-BASED COPOLYMER COMPOSITION, METHOD OF PREPARING THE SAME, AND RUBBER COMPOSITION INCLUDING THE SAME

CROSS-REFERENCE TO RELATED APPLICATIONS

The present application is a national stage entry under 35 U.S.C. § 371 of International Application No. PCT/KR2020/011743 filed on Sep. 2, 2020, which claims priority to Korean Patent Application No. 10-2019-0126418, filed on Oct. 11, 2019, and Korean Patent Application No. 10-2020-0105337, filed on Aug. 21, 2020, the entire contents of which are incorporated herein by reference.

TECHNICAL FIELD

The present invention relates to an acrylic copolymer composition, and more particularly, to an acrylic copolymer composition having excellent water resistance, a method of preparing the same, and an acrylic copolymer mixture including the same.

BACKGROUND ART

Recently, as interest in eco-friendly technology grows, interest in environmentally-friendly tires which are applied to a vehicle is rapidly increasing. The environmentally-friendly tires are directly related to low fuel consumption through fuel saving of a vehicle. The environmentally-friendly tires decrease rolling resistance of tires to reduce unnecessary fuel consumption and reduce emission of carbon dioxide which is a main cause of global warming.

Accordingly, as a rubber material used in the environmentally-friendly tire, a conjugated diene-based copolymer having low rolling resistance, excellent abrasion resistance and tensile properties, and adjustment stability represented by wet skid resistance has been demanded.

In order to decrease the rolling resistance of the tire, there is a method of decreasing a hysteresis loss of vulcanized rubber, and as an evaluation index of the vulcanized rubber, rebound resilience at 50° C. to 80° C., tan δ, Goodrich heating, or the like is used. That is, a rubber material having high rebound resilience or low tan δ and low Goodrich heating at the above temperature is preferred.

As a rubber material having a small hysteresis loss, natural rubber, polyisoprene rubber, polybutadiene rubber, or the like is known, but these rubbers have a low wet skid resistance. Accordingly, recently, a conjugated diene-based polymer or copolymer such as styrene-butadiene rubber (hereinafter, referred to as SBR) or butadiene rubber (hereinafter, referred to as BR) has been prepared by emulsion polymerization or solution polymerization and used as rubber for tires.

These rubbers for tires are generally mixed with a filler such as carbon black or silica for supplementing physical properties of rubber and used. Among them, SBR prepared by solution polymerization is used by introducing a monomer having a polar group at a terminal of the polymer by anionic polymerization to improve a silica affinity of a silica filler; however, the SBR prepared by the solution polymerization has low abrasion resistance as compared with SBR prepared by emulsion polymerization. In addition, SBR prepared by the emulsion polymerization has a problem in that it is difficult to introduce a repeating unit derived from a desired monomer to a specific part due to the characteristics of emulsion polymerization, and thus, it is difficult to introduce a polar group for improving the silica affinity of the silica filler to a polymer chain.

Therefore, there is currently continuously demanded a study on a rubber material for a tire which has an excellent affinity with a filler, while using SBR prepared by emulsion polymerization for improving abrasion resistance of the tire.

DISCLOSURE

Technical Problem

In order to solve the problems mentioned in the background art, an object of the present invention is to improve abrasion resistance, processability, and viscoelasticity of a rubber composition by imparting a silica affinity to a conjugated diene-based copolymer while securing the abrasion resistance of the rubber composition through emulsion polymerization of the conjugated diene-based copolymer.

That is, the present invention is devised to solve the problems mentioned in the background art, and an object of the present invention is to provide a conjugated diene-based copolymer composition capable of implementing securement of abrasion resistance and improvement of processability of a rubber composition including the conjugated diene-based copolymer composition by imparting a silica affinity from a first conjugated diene-based copolymer prepared by emulsion polymerization, and implementing improvement of viscoelasticity of the rubber composition including the conjugated diene-based copolymer composition through a second conjugated diene-based copolymer, a method of preparing the same, and a rubber composition including the same.

Technical Solution

In one general aspect, a conjugated diene-based copolymer composition includes a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer, wherein the first conjugated diene-based copolymer includes 0.01 wt % to 1 wt % of the repeating unit derived from the hydroxyalkyl (meth)acrylate monomer, and the second conjugated diene-based copolymer includes 4.5 wt % to 6.5 wt % of the repeating unit derived from the hydroxyalkyl (meth)acrylate monomer.

In another general aspect, a method of preparing a conjugated diene-based copolymer composition includes mixing a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer, wherein the first conjugated diene-based copolymer includes 0.01 wt % to 1 wt % of the repeating unit derived from the hydroxyalkyl (meth)acrylate monomer, and the second conjugated diene-based copolymer includes 4.5 wt % to 6.5 wt % of the repeating unit derived from the hydroxyalkyl (meth)acrylate monomer.

In still another general aspect, a rubber composition includes a rubber raw material including the conjugated diene-based copolymer composition.

Advantageous Effects

In a case where the conjugated diene-based copolymer composition according to the present invention is used as a rubber raw material component of a rubber composition, polymerization is performed through emulsion polymerization, such that the abrasion resistance of the rubber composition including a conjugated diene-based copolymer is secured and the silica affinity is imparted to the conjugated diene-based copolymer composition, and thus, the abrasion resistance of the rubber composition including the conjugated diene-based copolymer composition is improved and the processability and viscoelasticity of the rubber composition are excellent.

BEST MODE

The terms and words used in the description and claims of the present invention are not to be construed as general or dictionary meanings but are to be construed as meanings and concepts meeting the technical ideas of the present invention based on a principle that the inventors can appropriately define the concepts of terms in order to describe their own inventions in the best mode.

The term "repeating unit derived" in the present application may refer to a component or structure derived from a certain material or the material itself. As a specific example, the term "repeating unit derived" may refer to a repeating unit formed in a polymer by an added monomer participating in a polymerization reaction during polymerization of a polymer.

A conjugated diene-based copolymer composition according to the present invention may include a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer. The first conjugated diene-based copolymer may include 0.01 wt % to 1 wt % of the repeating unit derived from the hydroxyalkyl (meth)acrylate monomer, and the second conjugated diene-based copolymer may include 4.5 wt % to 6.5 wt % of the repeating unit derived from the hydroxyalkyl (meth)acrylate monomer.

According to an exemplary embodiment of the present invention, the conjugated diene-based copolymer composition includes the first conjugated diene-based copolymer and the second conjugated diene-based copolymer including the repeating units derived from the hydroxyalkyl (meth)acrylate monomers in different contents at an adjusted specific ratio, such that, when the conjugated diene-based copolymer composition is included as a rubber raw material component of a rubber composition, a silica affinity with a silica-based filler used as a filler is secured, processability of the rubber composition is improved, and viscoelasticity of the rubber composition is secured.

According to an exemplary embodiment of the present invention, each of the first conjugated diene-based copolymer and the second conjugated diene-based copolymer may include the repeating unit derived from the hydroxyalkyl (meth)acrylate monomer, and the first and second conjugated diene-based copolymers may include the repeating units derived from the hydroxyalkyl (meth)acrylate monomers in different contents, such that the rubber composition may have excellent abrasion resistance, mechanical properties, and viscoelasticity and may secure improved processability.

The repeating unit derived from the hydroxyalkyl (meth) acrylate monomer included in each of the copolymers may be a repeating unit formed by polymerization of a hydroxyalkyl (meth)acrylate monomer, and may form a main chain in a copolymer together with the repeating unit derived from the aromatic vinyl monomer and the repeating unit derived from the conjugated diene-based monomer. The repeating unit derived from the hydroxyalkyl (meth)acrylate monomer is a repeating unit distributed in the copolymer to impart the affinity with the silica-based filler. As a specific example, a hydroxy group of the repeating unit derived from the hydroxyalkyl (meth)acrylate monomer distributed in the copolymer forms a hydrogen bond with a hydroxy group which is present in the silica-based filler to impart the affinity between the conjugated diene-based copolymer composition and the silica-based filler, such that dispersibility of the filler in the rubber composition is excellent, thereby improving the mechanical properties of the rubber composition including the same.

According to an exemplary embodiment of the present invention, the hydroxyalkyl (meth)acrylate monomer may be a hydroxyalkyl (meth)acrylate monomer having an alkyl group having 1 to 10 carbon atoms, 2 to 8 carbon atoms, or 2 to 4 carbon atoms. Within these ranges, an increase in hydrophobicity of the hydroxyalkyl (meth)acrylate monomer by the alkyl group is prevented to improve the affinity with the silica-based filler. As a specific example, the hydroxyalkyl (meth)acrylate monomer may be one or more selected from the group consisting of hydroxyethyl (meth) acrylate, hydroxypropyl (meth)acrylate, and hydroxybutyl (meth)acrylate. Here, the hydroxyalkyl (meth)acrylate monomer may refer to hydroxyalkyl acrylate or hydroxyalkyl methacrylate.

In addition, according to an exemplary embodiment of the present invention, in the first conjugated diene-based copolymer, a content of the repeating unit derived from the hydroxyalkyl (meth)acrylate monomer may be 0.01 wt % to 1 wt %, or 0.5 wt % to 1 wt %, with respect to a total content of the first conjugated diene-based copolymer, and in the second conjugated diene-based copolymer, a content of the repeating unit derived from the hydroxyalkyl (meth)acrylate monomer may be 4.5 wt % to 6.5 wt %, or 5 wt % to 6 wt %, with respect to a total content of the second conjugated diene-based copolymer. Within these ranges, the affinity with the silica-based filler is maximized while preventing deterioration of the mechanical properties, such that the mechanical properties of the rubber composition including the same are entirely improved and a balance between the physical properties is excellent.

Meanwhile, according to an exemplary embodiment of the present invention, each of the first conjugated diene-based copolymer and the second conjugated diene-based copolymer may include the repeating unit derived from the aromatic vinyl monomer and the repeating unit derived from the conjugated diene-based monomer.

According to an exemplary embodiment of the present invention, in each of the first conjugated diene-based copolymer and the second conjugated diene-based copolymer, the repeating unit derived from the aromatic vinyl monomer may be a repeating unit formed by polymerization of an aromatic vinyl monomer during the polymerization, and may form a main chain (backbone) in the copolymer together with the repeating unit derived from the conjugated diene-based monomer and the repeating unit derived from the hydroxyalkyl (meth)acrylate monomer. The aromatic vinyl monomer to form the repeating unit derived from the aromatic vinyl monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene, and as a more specific example, the aromatic vinyl monomer may be styrene.

According to an exemplary embodiment of the present invention, a content of the repeating unit derived from the aromatic vinyl monomer may be 10 wt % to 50 wt %, 15 wt % to 49.5 wt %, or 20 wt % to 48.5 wt %, with respect to the total content of the first conjugated diene-based copolymer, and may be 10 wt % to 50 wt %, 12 wt % to 48 wt %, or 17 wt % to 45 wt %, with respect to the total content of the second conjugated diene-based copolymer. Within these ranges, the deterioration of the mechanical properties of the rubber composition including the conjugated diene-based copolymer composition as a rubber raw material component is prevented, while improving processability of the conjugated diene-based copolymer composition.

In addition, according to an exemplary embodiment of the present invention, in the each of the first conjugated diene-based copolymer and the second conjugated diene-based copolymer, the repeating unit derived from the conjugated diene-based monomer may be a repeating unit formed by polymerization of a conjugated diene-based monomer during the polymerization, and may form a main chain in the copolymer together with the repeating unit derived from the aromatic vinyl monomer and the repeating unit derived from the hydroxyalkyl (meth)acrylate monomer. The conjugated diene-based monomer to form the repeating unit derived from the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo refers to a halogen atom), and as a specific example, the conjugated diene-based monomer may be 1,3-butadiene.

According to an exemplary embodiment of the present invention, a content of the repeating unit derived from the conjugated diene-based monomer may be 49 wt % to 89 wt %, 54 wt % to 84 wt %, or 59 wt % to 79 wt %, with respect to the total content of the first conjugated diene-based copolymer, and may be 45 wt % to 85 wt %, or 57 wt % to 77 wt %, with respect to the total content of the second conjugated diene-based copolymer. Within these ranges, the viscoelasticity of the rubber composition including the conjugated diene-based copolymer composition as a rubber raw material component is excellent, and the balance between the physical properties is excellent.

As another example, in an exemplary embodiment of the present invention, the first conjugated diene-based copolymer may include 10 wt % to 50 wt % of the repeating unit derived from the aromatic vinyl monomer, 49 wt % to 89 wt % of the repeating unit derived from the conjugated diene-based monomer, and 0.01 wt % to 1 wt % of the repeating unit derived from the hydroxyalkyl (meth)acrylate monomer, and the second conjugated diene-based copolymer may include 10 wt % to 50 wt % of the repeating unit derived from the aromatic vinyl monomer, 45 wt % to 85 wt % of the repeating unit derived from the conjugated diene-based monomer, and 4.5 wt % to 6.5 wt % of the repeating unit derived from the hydroxyalkyl (meth)acrylate monomer.

Meanwhile, in an exemplary embodiment of the present invention, a total content of the repeating units derived from the hydroxyalkyl (meth)acrylate monomers included in the first and second conjugated diene-based copolymers may be 0.5 to 8 wt %, and specifically, 1 to 4 wt %, with respect to a total content of the first and second conjugated diene-based copolymers. Within these ranges, the affinity with silica and the viscoelasticity are excellent, and the processability is also excellent.

In addition, according to an exemplary embodiment of the present invention, a Mooney viscosity (MV) of each of the first and second conjugated diene-based copolymers at 100° C. may be 30 to 80, 40 to 70, or 50 to 60. Within these ranges, the deterioration of the mechanical properties of the conjugated diene-based copolymer composition is prevented, and the processability is improved.

In addition, according to an exemplary embodiment of the present invention, a weight average molecular weight of each of the first and second conjugated diene-based copolymers may be 700,000 g/mol to 1,300,000 g/mol, 800,000 g/mol to 1,200,000 g/mol, or 900,000 g/mol to 1,100,000 g/mol, and within this ranges, the Mooney viscosity described above is easily implemented.

According to an exemplary embodiment of the present invention, each of the first conjugated diene-based copolymer and the second conjugated diene-based copolymer may a random copolymer, and in this case, the balance between the physical properties is excellent. The random copolymer may refer to that the respective repeating units derived from the monomers constituting a copolymer are arranged in disorder.

In addition, according to an exemplary embodiment of the present invention, the first conjugated diene-based copolymer and the second conjugated diene-based copolymer may be included in the conjugated diene-based copolymer composition at a weight ratio of 6:4 to 8:2 or 6.5:3.5 to 7.5:2.5. Within these ranges, the first conjugated diene-based copolymer for imparting the silica affinity and improving the processability and the second conjugated diene-based copolymer for improving the viscoelasticity are mixed with each other, such that the physical properties described above are maximized while preventing deterioration of the balance between the physical properties.

In addition, according to an exemplary embodiment of the present invention, a Mooney viscosity (MV) of a mixture of the conjugated diene-based copolymer composition at 100° C. may be 20 to 150, 30 to 120, or 45 to 85. Within these ranges, processability and productivity of the rubber composition are excellent, and mechanical properties of the rubber composition are excellent.

In addition, according to an exemplary embodiment of the present invention, a glass transition temperature of the conjugated diene-based copolymer composition may be −60° C. or higher, −50° C. or higher, or −50° C. to −15° C. Within these ranges, the abrasion resistance and the viscoelasticity of the rubber composition including the conjugated diene-based copolymer composition are excellent.

In addition, the present invention provides a method of preparing the conjugated diene-based copolymer composition.

The method may include a step (step A) of mixing a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer. The first conjugated diene-based copolymer may include 0.01 wt % to 1 wt % of the repeating unit derived from the hydroxyalkyl (meth)acrylate monomer, and the second conjugated diene-based copolymer may include 4.5 wt % to 6.5 wt % of the repeating unit derived from the hydroxyalkyl (meth)acrylate monomer.

Here, the first conjugated diene-based copolymer may be prepared by emulsion-polymerizing a first monomer mixture including an aromatic vinyl monomer, a conjugated diene-based monomer, and a hydroxyalkyl (meth)acrylate monomer. Specifically, the first conjugated diene-based copolymer may be prepared by emulsion-polymerizing the first monomer mixture including 10 wt % to 50 wt % of the aromatic vinyl monomer, 49 wt % to 89 wt % of the conjugated diene-based monomer, and wt % to 1 wt % of the hydroxyalkyl (meth)acrylate monomer.

In addition, the second conjugated diene-based copolymer may be prepared by emulsion-polymerizing a second monomer mixture including an aromatic vinyl monomer, a conjugated diene-based monomer, and a hydroxyalkyl (meth) acrylate monomer. Specifically, the second conjugated diene-based copolymer may be prepared by emulsion-polymerizing the second monomer mixture including 10 wt % to 45 wt % of the aromatic vinyl monomer, 45 wt % to 85 wt % of the conjugated diene-based monomer, and 4.5 wt % to 6.5 wt % of the hydroxyalkyl (meth)acrylate monomer.

In addition, the emulsion polymerization may be performed by an emulsion polymerization method for performing a radical polymerization of the respective monomers, and as a specific example, the emulsion polymerization may be performed in the presence of an emulsifier, an initiator, a chain transfer agent, or the like.

According to an exemplary embodiment of the present invention, each of the first monomer mixture and the second monomer mixture may be a monomer mixture including the respective monomers to form repeating units derived from the monomers included in the first conjugated diene-based copolymer and the second conjugated diene-based copolymer, and a content of each of the monomers in the first monomer mixture and the second monomer mixture may be the same as that of the repeating unit derived from each of the monomers described above.

In addition, according to an exemplary embodiment of the present invention, the emulsion polymerizations may be independently performed or may be sequentially performed.

According to an exemplary embodiment of the present invention, an emulsifier which may be generally used in the art may be used as the emulsifier to be added in the emulsion polymerization. As a specific example, one or more emulsifiers selected from the group consisting of carboxylate-based, sulfate-based, phosphate-based, succinate-based, sulfosuccinate-based, sulfonate-based, and disulfonate-based emulsifiers may be used. As a more specific example, one or more emulsifiers selected from the group consisting of alkylaryl sulfonate, alkali methyl alkyl sulfate, sulfonated alkyl ester, a soap of fatty acid, and an alkali salt of rosin acid may be used, and in this case, a stable polymerization environment is provided. The emulsifier may be added, for example, in an amount of 0.1 parts by weight to 5 parts by weight, or 0.5 parts by weight to 3 parts by weight, with respect to a total content of 100 parts by weight of each of the first monomer mixture and the second monomer mixture. Within these ranges, polymerization stability of latex is excellent, and foam generation during the polymerization is minimized.

According to an exemplary embodiment of the present invention, the chain transfer agent to be added in the emulsion polymerization may be one or more selected from the group consisting of mercaptans such as α-methylstyrenedimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide, and as a specific example, the chain transfer agent may be t-dodecyl mercaptan. The chain transfer agent may be added, for example, in an amount of 0.2 parts by weight to 0.6 parts by weight with respect to the total content of 100 parts by weight of each of the first monomer mixture and the second monomer mixture.

According to an exemplary embodiment of the present invention, the polymerization initiator to be added in the emulsion polymerization is used to adjust a molecular weight, gel content, and gel structure of the conjugated diene-based copolymer according to the present invention, and may be a radical initiator. The radical initiator may be, for example, one or more selected from the group consisting of inorganic peroxide such as sodium persulfate, potassium persulfate, ammonium persulfate, potassium perphosphate, or hydrogen peroxide; organic peroxide such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, or t-butyl peroxy isobutylate; and an azobis-based compound such as azobisisobutyronitrile, azobis-2,4-dimethylvaleronitrile, azobis-cyclohexanecarbonitrile, or methyl azobisisobutyrate. As a specific example, the radical initiator may be inorganic peroxide, and as a more specific example, the radical initiator may be persulfate. The polymerization initiator may be added, for example, in an amount of 0.01 to 2 parts by weight, or 0.02 to 1.5 parts by weight, with respect to the total content of 100 parts by weight of each of the first monomer mixture and the second monomer mixture. Within these ranges, a polymerization speed may be appropriately adjusted, such that polymerization may be adjusted and productivity may also be excellent.

In addition, according to an exemplary embodiment of the present invention, in the emulsion polymerization, an additive such as an activator, a chelating agent, a dispersant, a pH adjuster, a deoxidizer, a particle size adjuster, an anti-aging agent, or an oxygen scavenger may be added, if necessary, in a range in which the physical properties of the rubber composition are not deteriorated.

According to an exemplary embodiment of the present invention, each of the first conjugated diene-based copolymer and the second conjugated diene-based copolymer that are obtained by the emulsion polymerization may be in a latex state, and the method may include coagulation, aging, dehydration, and drying steps to obtain the latex in a powder form.

Meanwhile, according to an exemplary embodiment of the present invention, the step A is a step of mixing the first conjugated diene-based copolymer and the second conjugated diene-based copolymer, may be performed by mixing the conjugated diene-based copolymers in a powder form, and may be performed by mixing a first conjugated diene-based copolymer latex including the first conjugated diene-based copolymer and a second conjugated diene-based copolymer latex including the second conjugated diene-based copolymer in a latex form for uniform mixing.

In addition, according to the present invention, a rubber composition including the conjugated diene-based copolymer composition as a rubber raw material is provided.

According to an exemplary embodiment of the present invention, the conjugated diene-based copolymer composition may be included in the rubber raw material in an amount of 10 wt % or more, 10 wt % to 100 wt %, or 50 wt % to 90 wt %. Within these ranges, the mechanical properties such as tensile strength and abrasion resistance are excellent, and the balance between the physical properties is excellent.

In addition, according to an exemplary embodiment of the present invention, the rubber raw material may further include one or more rubber components selected from the group consisting of natural rubber and synthetic rubber, if necessary, in addition to the conjugated diene-based copolymer composition. In this case, a content of the rubber component may be 90 wt % or less, or 10 wt % to 40 wt %, with respect to a total content of the rubber raw material. As a specific example, the rubber component may be included in an amount of 1 part by weight to 900 parts by weight with respect to 100 parts by weight of the conjugated diene-based copolymer. As an example, the rubber component may be natural rubber or synthetic rubber. As a specific example, the rubber component may be natural rubber (NR) including cis-1,4-polyisoprene; modified natural rubber such as epoxidized natural rubber (ENR), deproteinized natural rubber (DPNR), or hydrogenated natural rubber which is obtained by modifying or purifying the general natural rubber; or synthetic rubber such as a styrene-butadiene copolymer (SBR), polybutadiene (BR), polyisoprene (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicon rubber, epichlorohydrin rubber, butyl rubber, or halogenated butyl rubber, and among them, one or a mixture of two or more may be used.

According to an exemplary embodiment of the present invention, a silica-based filler may included in the rubber composition in an amount of 1 part by weight to 200 parts by weight, or 10 parts by weight to 120 parts by weight, with respect to 100 parts by weight of the rubber raw material. As a specific example, the silica-based filler may be one or more selected from the group consisting of wet silica, dry silica, calcium silicate, aluminum silicate, and colloid silica, and preferably may be wet silica which is the most excellent in an improvement effect of a fracture property and a compatible effect of wet grip. In addition, the rubber composition may further include a carbon black-based filler, if necessary.

As another example, in a case where silica is used as the filler, a silane coupling agent for improving reinforcement and a low heating property may be used together. As a specific example, the silane coupling agent may be bis(3-triethoxysilylpropyl) tetrasulfide, bis(3-triethoxysilylpropyl) trisulfide, bis(3-triethoxysilylpropyl) disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N, N-dimethylthiocarbamoyltetrasulfide, 2-triethoxysilylethyl-N, N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N, N-dimethylthiocarbamoyltetrasulfide, dimethoxymethylsilylpropylbenzothiazolyltetrasulfide, or the like, and among them, one or a mixture of two or more may be used. Preferably, in consideration of the reinforcement improvement effect, the silane coupling agent may be bis(3-triethoxysilylpropyl) polysulfide or 3-trimethoxysilylpropylbenzothiazyltetrasulfide.

In addition, since the rubber composition according to an exemplary embodiment of the present invention includes the first conjugated diene-based copolymer in which a functional group having an affinity with silica is introduced to the conjugated diene-based copolymer composition, a mixing amount of the silane coupling agent may be reduced as compared with a common case, and accordingly, the silane coupling agent may be used in an amount of 1 part by weight to 20 parts by weight, or 5 parts by weight to 15 parts by weight, with respect to 100 parts by weight of the silica-based filler. Within these ranges, the effect as a coupling agent is sufficiently exerted, and gelation of the rubber raw material is prevented.

The rubber composition according to an exemplary embodiment of the present invention may be sulfur-crosslinkable, and may further include a vulcanizing agent. The vulcanizing agent may be specifically sulfur powder, and may be included in an amount of 0.1 parts by weight to 10 parts by weight with respect to 100 parts by weight of the rubber raw material. Within this range, a required modulus and strength of a vulcanized rubber composition are secured, and a low fuel consumption is excellent.

The rubber composition according to an exemplary embodiment of the present invention may further include various additives used in general rubber industries, specifically, a vulcanization accelerator, a process oil, a plasticizer, an anti-aging agent, an anti-scorching agent, zinc white, stearic acid, a thermosetting resin, a thermoplastic resin, or the like, in addition to the above components.

As an example, a thiazole-based compound such as 2-mercaptobenzothiazole (M), dibenzothiazildisulfide (DM), or N-cyclohexyl-2-benzothiazilsulpheneamide (CZ), or a guanidine-based compound such as diphenylguanidine (DPG) may be used as the vulcanization accelerator. The vulcanization accelerator may be included in an amount of 0.1 parts by weight to 5 parts by weight with respect to 100 parts by weight of the rubber raw material.

The process oil serves as a softening agent in the rubber composition, and as an example, may be a paraffin-based, naphthene-based, or aromatic-based compound. In consideration of tensile strength and abrasion resistance, an aromatic-based process oil may be used, and in consideration of a hysteresis loss and low temperature properties, a naphthene-based or paraffin-based process oil may be used. As an example, the process oil may be contained in an amount of 100 parts by weight or less with respect to 100 parts by weight of the rubber raw material. Within this range, tensile strength and a low heating property (low fuel consumption) of vulcanized rubber are prevented from being deteriorated.

As an example, the anti-aging agent may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, a high temperature condensate of diphenylamine and acetone, or the like, and may be used in an amount of 0.1 parts by weight to 6 parts by weight with respect to 100 parts by weight of the rubber raw material.

The rubber composition according to an exemplary embodiment of the present invention may be obtained by kneading using a kneader such as a Banbury mixer, a roll, or an internal mixer by the mixing formulation, and the rubber composition having a low heating property and excellent abrasion resistance may be obtained by a vulcanizing process after molding processing.

According to an exemplary embodiment of the present invention, the rubber composition may be useful in manufacture of each member of tires such as a tire tread, an under tread, a side wall, carcass coating rubber, belt coating rubber, a bead filler, a shaper, and a bead coating rubber, or various rubber products for industrial use such as anti-vibration rubber, a belt conveyor, and a hose.

In addition, the present invention provides a tire manufactured by using the rubber composition of the present invention.

The tire may include a tire or a tire tread, and as a specific example, the tire or tire tread may be a tire or a tire tread used in summer tires, winter tires, snow tires, or all season (four-season) tires.

Hereinafter, the present invention will be described in more detail by examples. However, the following examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of First Conjugated Diene-Based Copolymer>

To a nitrogen-substituted polymerization reactor (autoclave), 200 parts by weight of ion exchange water, 48.5 parts by weight of styrene, 51 parts by weight of 1,3-butadiene, and 0.5 parts by weight of hydroxypropyl methacrylate as monomers, 5 parts by weight of a soap of fatty acid and an alkali salt of rosin acid as an emulsifier, 0.5 parts by weight of cumene hydroperoxide as an initiator, and 0.5 parts by weight of dodecyl mercaptan as a chain transfer agent were collectively added, and a reaction was performed at a reaction temperature of 10° C. The reaction was terminated at the point where a polymerization conversion rate was 60%, thereby preparing a first conjugated diene-based copolymer latex.

<Preparation of Second Conjugated Diene-Based Copolymer>

To a nitrogen-substituted polymerization reactor (autoclave), 200 parts by weight of ion exchange water, 45 parts by weight of styrene, 49.5 parts by weight of 1,3-butadiene, and 5.5 parts by weight of hydroxypropyl methacrylate as monomers, 5 parts by weight of a soap of fatty acid and an alkali salt of rosin acid as an emulsifier, 0.5 parts by weight of cumene hydroperoxide as an initiator, and 0.5 parts by weight of dodecyl mercaptan as a chain transfer agent were collectively added, and a reaction was performed at a reaction temperature of 10° C. The reaction was terminated at the point where a polymerization conversion rate was 60%, thereby preparing a second conjugated diene-based copolymer latex.

<Preparation of Conjugated Diene-Based Copolymer Composition>

70 parts by weight (based on a solid content) of the obtained first conjugated diene-based copolymer latex and 30 parts by weight (based on a solid content) of the obtained second conjugated diene-based copolymer latex were stirred at room temperature for 1 hour to obtain a conjugated diene-based copolymer composition latex, and the obtained conjugated diene-based copolymer composition latex was slowly added dropwise to methanol to be precipitated and dried in an oven at 100° C. for 1 hour, thereby obtaining conjugated diene-based copolymer composition powder.

Example 2

Example 2 was performed in the same manner as that of Example 1, except that 60 parts by weight (based on a solid content) of the first conjugated diene-based copolymer latex and 40 parts by weight (based on a solid content) of the second conjugated diene-based copolymer latex were stirred at room temperature for 1 hour in Example 1.

Example 3

Example 3 was performed in the same manner as that of Example 1, except that 80 parts by weight (based on a solid content) of the first conjugated diene-based copolymer latex and 20 parts by weight (based on a solid content) of the second conjugated diene-based copolymer latex were stirred at room temperature for 1 hour in Example 1.

Example 4

Example 4 was performed in the same manner as that of Example 1, except that hydroxyethyl methacrylate was added instead of the hydroxypropyl methacrylate when preparing the first conjugated diene-based copolymer and the second conjugated diene-based copolymer in Example 1.

Example 5

Example 5 was performed in the same manner as that of Example 1, except that 50 parts by weight (based on a solid content) of the first conjugated diene-based copolymer latex and 50 parts by weight (based on a solid content) of the second conjugated diene-based copolymer latex were stirred at room temperature for 1 hour in Example 1.

Example 6

Example 6 was performed in the same manner as that of Example 1, except that 90 parts by weight (based on a solid content) of the first conjugated diene-based copolymer latex and 10 parts by weight (based on a solid content) of the second conjugated diene-based copolymer latex were stirred at room temperature for 1 hour in Example 1.

Comparative Example 1

To a nitrogen-substituted polymerization reactor (autoclave), 200 parts by weight of ion exchange water, 49 parts by weight of styrene and 51 parts by weight of 1,3-butadiene as monomers, 5 parts by weight of a soap of fatty acid and an alkali salt of rosin acid as an emulsifier, 0.5 parts by weight of cumene hydroperoxide as an initiator, and 0.5 parts by weight of dodecyl mercaptan as a chain transfer agent were collectively added, and a reaction was performed at a reaction temperature of 10° C. The reaction was terminated at the point where a polymerization conversion rate was 60%, thereby preparing a conjugated diene-based copolymer latex.

The obtained conjugated diene-based copolymer latex was slowly added dropwise to methanol to be precipitated and dried in an oven at 100° C. for 1 hour, thereby obtaining conjugated diene-based copolymer composition powder.

Comparative Example 2

Comparative Example 2 was performed in the same manner as that of Example 1, except that the conjugated diene-based copolymer latex prepared in Comparative Example 1 was used as the first conjugated diene-based copolymer latex when preparing the conjugated diene-based copolymer composition in Example 1.

Comparative Example 3

<Preparation of Second Conjugated Diene-Based Copolymer>

To a nitrogen-substituted polymerization reactor (autoclave), 200 parts by weight of ion exchange water, 45.5 parts by weight of styrene, 51 parts by weight of 1,3-butadiene, and 3.5 parts by weight of hydroxypropyl methacrylate as monomers, 5 parts by weight of a soap of fatty acid and an alkali salt of rosin acid as an emulsifier, 0.5 parts by weight of cumene hydroperoxide as an initiator, and 0.5 parts by weight of dodecyl mercaptan as a chain transfer agent were collectively added, and a reaction was performed at a reaction temperature of 10° C. The reaction was terminated at the point where a polymerization conversion rate was 60%, thereby preparing a second conjugated diene-based copolymer latex.

<Preparation of Conjugated Diene-Based Copolymer Composition>

70 parts by weight (based on a solid content) of the first conjugated diene-based copolymer latex prepared in Example 1 and 30 parts by weight (based on a solid content) of the prepared second conjugated diene-based copolymer latex were stirred at room temperature for 1 hour to obtain a conjugated diene-based copolymer composition latex, and the obtained conjugated diene-based copolymer composition latex was slowly added dropwise to methanol to be precipitated and dried in an oven at 100° C. for 1 hour, thereby obtaining conjugated diene-based copolymer composition powder.

Comparative Example 4

<Preparation of Second Conjugated Diene-Based Copolymer>

To a nitrogen-substituted polymerization reactor (autoclave), 200 parts by weight of ion exchange water, 46.4 parts by weight of styrene, 51 parts by weight of 1,3-butadiene, s by weight of hydroxypropyl methacrylate as monomers, 5 parts by weight of a soap of fatty acid and an alkali salt of rosin acid as an emulsifier, 0.5 parts by weight of cumene hydroperoxide as an initiator, and 0.5 parts by weight of dodecyl mercaptan as a chain transfer agent were collectively added, and a reaction was performed at a reaction temperature of 10° C. The reaction was terminated at the point where a polymerization conversion rate was 60%, thereby preparing a second conjugated diene-based copolymer latex.

<Preparation of Conjugated Diene-Based Copolymer Composition>

70 parts by weight (based on a solid content) of the first conjugated diene-based copolymer latex prepared in Example 1 and 30 parts by weight (based on a solid content) of the prepared second conjugated diene-based copolymer latex were stirred at room temperature for 1 hour to obtain a conjugated diene-based copolymer composition latex, and the obtained conjugated diene-based copolymer composition latex was slowly dropwise to methanol to be precipitated and dried in an oven at 100° C. for 1 hour, thereby obtaining conjugated diene-based copolymer composition powder.

Comparative Example 5

<Preparation of First Conjugated Diene-Based Copolymer>

To a nitrogen-substituted polymerization reactor (autoclave), 200 parts by weight of ion exchange water, 48.5 parts by weight of styrene, 50 parts by weight of 1,3-butadiene, and 1.5 parts by weight of hydroxypropyl methacrylate as monomers, 5 parts by weight of a soap of fatty acid and an alkali salt of rosin acid as an emulsifier, 0.5 parts by weight of cumene hydroperoxide as an initiator, and 0.5 parts by weight of dodecyl mercaptan as a chain transfer agent were collectively added, and a reaction was performed at a reaction temperature of 10° C. The reaction was terminated at the point where a polymerization conversion rate was 60%, thereby preparing a first conjugated diene-based copolymer latex.

<Preparation of Conjugated Diene-Based Copolymer Composition>

70 parts by weight (based on a solid content) of the prepared first conjugated diene-based copolymer latex and 30 parts by weight (based on a solid content) of the second conjugated diene-based copolymer latex prepared in Example 1 were stirred at room temperature for 1 hour to obtain a conjugated diene-based copolymer composition latex, and the obtained conjugated diene-based copolymer composition latex was slowly added dropwise to methanol to be precipitated and dried in an oven at 100° C. for 1 hour, thereby obtaining conjugated diene-based copolymer composition powder.

Experimental Example

Experimental Example

For comparison and analysis of the physical properties of each of the rubber compositions including the conjugated diene-based copolymer compositions prepared in Examples 1 to 6 and Comparative Examples 1 to 5 and the molded articles produced using the same, a rubber specimen was prepared as follows, and a Mooney viscosity, abrasion resistance, viscoelasticity, and processability were measured by the following methods. The results are shown in Table 2.

\* Preparation of Rubber Specimen 100 parts by weight of each of the conjugated diene-based copolymer compositions of Examples 1 to 6 and Comparative Examples 1 to 5 and 30 parts by weight of butadiene rubber (produced by LG Chem Ltd., grade name BR1208) were used as rubber raw materials and mixed with each other under the mixing condition shown in Table 1. The raw materials shown in Table 1 are represented in parts by weight based on 100 parts by weight of the conjugated diene-based copolymer.

TABLE 1

| Classification | Raw material | Content (parts by weight) |
|---|---|---|
| First stage kneading | Conjugated diene-based copolymer composition | 100 |
| | Butadiene rubber | 30 |
| | Silica | 70 |
| | Coupling agent | 12 |
| | Process oil | 9 |
| | Zinc white | 2 |
| | Stearic acid | 1 |
| | Antioxidant | 2 |
| | Anti-aging agent | 1.5 |
| | Wax | 2 |
| Second stage kneading | Sulfur | 1.5 |
| | Rubber accelerator | 2 |
| | Vulcanization accelerator | 2 |

Specifically, the rubber specimen was kneaded through first stage kneading and second stage kneading. In the first stage kneading, rubber raw materials (conjugated diene-based copolymer composition and butadiene rubber), a filler, an organosilane coupling agent, a process oil, zinc white, stearic acid, an antioxidant, an anti-aging agent, and wax were kneaded using a Banbury mixer equipped with a temperature control unit to obtain a primary mixture. In the second stage kneading, the primary mixture was cooled to room temperature, the primary mixture, sulfur, a rubber accelerator, and a vulcanization accelerator were added to a kneader and mixed with each other at a temperature of 100° C. or lower to obtain a secondary mixture, and then a rubber specimen for measuring the following physical properties was prepared.

Abrasion resistance: Preliminary abrasion was performed 500 times at room temperature and a load of 10 lb and main abrasion was performed 3,000 times using No. 152 Akron Type Abrasion Test (manufactured by Yasuda Co., Ltd.), and then a volume reduction amount was measured.

Viscoelasticity: tan δ was measured using DMTS 500N manufactured by Gabo from Germany, by carrying out temperature sweep while heating at 2° C./min in a temperature range of −40° C. to 70° C., at a frequency of 10 Hz, a prestrain of 5%, and a dynamic strain of 0.5%, and Compound Tg was shown from a value on an X-axis of an inflection point in a tan δ graph. As tan δ at a low temperature of 0° C. is high, wet skid resistance is excellent, and as tan δ at a high temperature of 60° C. is low, the hysteresis loss is small, and low driving resistance (fuel consumption) is excellent.

* Mooney viscosity (MV, (ML1+4, @100° C.)): A Mooney viscosity was measured at 100° C. using MV-2000 (manufactured by ALPHA Technologies) with a Large Rotor at a rotor speed of 2±0.02 rpm, a specimen used in this case was left at room temperature (23±3° C.) for 30 minutes or longer, and 27±3 g of the specimen was collected and placed in the inside of a die cavity, and a platen was operated to perform the measurement for 4 minutes.

* Processability: Evaluation was performed in a 0.5 mm unit with a roll space from 1 mm to 4 mm at a roll temperature of 50° C., and 400 g of the specimen was initially milled for 30 seconds, and molding stability during mixing was evaluated from 0 to 10 points, thereby evaluating processability.

TABLE 2

| Classification | | Example | | | | | | Comparative Example | | | | |
| --- | --- | --- | --- | --- | --- | --- | --- | --- | --- | --- | --- | --- |
| | | 1 | 2 | 3 | 4 | 5 | 6 | 1 | 2 | 3 | 4 | 5 |
| Mixing Mooney viscosity | | 60 | 60 | 65 | 61 | 60 | 62 | 60 | 61 | 60 | 60 | 59 |
| Abrasion resistance | Loss content (cc) | 0.074 | 0.075 | 0.073 | 0.076 | 0.075 | 0.081 | 0.094 | 0.080 | 0.084 | 0.087 | 0.090 |
| Viscoelasticity | tan δ @ 0° C. | 0.286 | 0.280 | 0.271 | 0.280 | 0.273 | 0.261 | 0.222 | 0.260 | 0.249 | 0.244 | 0.237 |
| | tan δ @ 60° C. | 0.080 | 0.083 | 0.085 | 0.083 | 0.083 | 0.089 | 0.105 | 0.089 | 0.091 | 0.094 | 0.094 |
| Processability (10 point method) | | 10 | 9 | 9 | 10 | 8 | 8 | 10 | 7 | 7 | 7 | 7 |

As shown in Table 2, it could be confirmed that in the examples in which the conjugated diene-based copolymer composition according to the present invention was used, all of the abrasion resistance, the viscoelasticity, and the processability were excellent.

On the contrary, it could be confirmed that in Comparative Example 1 in which the copolymer including no repeating unit derived from the hydroxyalkyl (meth)acrylate monomer was used, the abrasion resistance and the viscoelasticity were significantly deteriorated as compared to those in the examples.

In addition, it could be confirmed that in Comparative Example 2 in which the second copolymer including the repeating unit derived from the hydroxyalkyl (meth)acrylate monomer was included, but the conjugated diene-based copolymer composition mixed with the copolymer including no repeating unit derived from the hydroxyalkyl (meth) acrylate monomer was used, not only the abrasion resistance and the viscoelasticity but also the processability was significantly deteriorated as compared to those in the examples.

In addition, it could be confirmed that in Comparative Examples 3 and 4 in which the first copolymer and the second copolymer each including the repeating unit derived from the hydroxyalkyl (meth)acrylate monomer were mixed with each other, but the conjugated diene-based copolymer composition in which the content of the hydroxyalkyl (meth) acrylate in the second copolymer was out of an appropriate range was used, and in Comparative Example 5 in which the conjugated diene-based copolymer composition in which the content of the hydroxyalkyl (meth)acrylate in the first copolymer was out of an appropriate range was used, not only the abrasion resistance and the viscoelasticity but also the processability was significantly deteriorated as compared to those in the examples.

The invention claimed is:

1. A conjugated diene-based copolymer composition comprising:
    a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer,
    wherein the first conjugated diene-based copolymer includes 0.01 wt % to 0.5 wt % of the repeating unit derived from the hydroxyalkyl (meth)acrylate monomer, and the second conjugated diene-based copolymer includes 4.5 wt % to 6.5 wt % of the repeating unit derived from the hydroxyalkyl (meth)acrylate monomer.

2. The conjugated diene-based copolymer composition of claim 1, wherein the first conjugated diene-based copolymer includes 10 wt % to 50 wt % of the repeating unit derived from the aromatic vinyl monomer and 49 wt % to 89 wt % of the repeating unit derived from the conjugated diene-based monomer.

3. The conjugated diene-based copolymer composition of claim 1, wherein the second conjugated diene-based copolymer includes 10 wt % to 50 wt % of the repeating unit derived from the aromatic vinyl monomer and 45 wt % to 85 wt % of the repeating unit derived from the conjugated diene-based monomer.

4. The conjugated diene-based copolymer composition of claim 1, wherein the first conjugated diene-based copolymer and the second conjugated diene-based copolymer are included in a weight ratio of 6:4 to 8:2.

5. The conjugated diene-based copolymer composition of claim 1, wherein the aromatic vinyl monomer is one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

6. The conjugated diene-based copolymer composition of claim 1, wherein the conjugated diene-based monomer is one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene.

7. The conjugated diene-based copolymer composition of claim 1, wherein the hydroxyalkyl (meth)acrylate monomer is one or more selected from the group consisting of hydroxyethyl (meth)acrylate, hydroxypropyl (meth)acrylate, and hydroxybutyl (meth)acrylate.

8. A method of preparing a conjugated diene-based copolymer composition, comprising:
    mixing a first conjugated diene-based copolymer and a second conjugated diene-based copolymer each including a repeating unit derived from an aromatic vinyl monomer, a repeating unit derived from a conjugated diene-based monomer, and a repeating unit derived from a hydroxyalkyl (meth)acrylate monomer,
    wherein the first conjugated diene-based copolymer includes 0.01 wt % to 0.5 wt % of the repeating unit derived from the hydroxyalkyl (meth)acrylate monomer, and the second conjugated diene-based copolymer includes 4.5 wt % to 6.5 wt % of the repeating unit derived from the hydroxyalkyl (meth)acrylate monomer.

9. The method of claim 8, wherein the first conjugated diene-based copolymer is prepared by emulsion-polymerizing a first monomer mixture including 10 wt % to 50 wt % of the aromatic vinyl monomer, 49 wt % to 89 wt % of the conjugated diene-based monomer, and 0.01 wt % to 0.5 wt % of the hydroxyalkyl (meth)acrylate monomer.

10. The method of claim 8, wherein the second conjugated diene-based copolymer is prepared by emulsion-polymerizing a second monomer mixture including 10 wt % to 50 wt % of the aromatic vinyl monomer, 45 wt % to 85 wt % of the conjugated diene-based monomer, and 4.5 wt % to 6.5 wt % of the hydroxyalkyl (meth)acrylate monomer.

11. A rubber composition comprising a rubber raw material including the conjugated diene-based copolymer composition of claim 1.

12. He rubber composition of claim 11, wherein a silica-based filler is included in the rubber composition in an amount of 1 part by weight to 200 parts by weight with respect to 100 parts by weight of the rubber raw material.

13. The rubber composition of claim 12, wherein the silica-based filler is one or more selected from the group consisting of wet silica, dry silica, calcium silicate, aluminum silicate, and colloid silica.

* * * * *